United States Patent Office 3,304,291
Patented Feb. 14, 1967

3,304,291
ANIONIC POLYMERIZATION OF LACTAMS WITH LACTAM-N-CARBAMIDO COMPOUNDS AS ACTIVATORS
Karl Dachs, Horst Brueggemann, and Edmund Boeck, Ludwigshafen (Rhine), Germany, assignors to Badische Anilin- & Soda-Fabrik Aktiengesellschaft, Ludwigshafen (Rhine), Germany
No Drawing. Filed Mar. 22, 1965, Ser. No. 441,860
Claims priority, application Germany, July 14, 1959, B 53,999
14 Claims. (Cl. 260—78)

This is a continuation-in-part of application Serial No. 42,240, filed July 12, 1960, now abandoned.

This invention relates to a process for the polymerization of lactams with alkaline reaction initiators. More specifically, the invention relates to a process for the polymerization of lactams with alkaline reaction initiators and other compounds which activate the base-catalyzed polymerization of lactams.

It is known to polymerize lactams over alkaline polymerization catalysts or reaction initiators. For this purpose there are used alkali metals or alkali metal compounds, such as sodium hydroxide or sodium carbonate, which react with the lactams, alkali metal salts of the lactams being formed by replacement of the hydrogen on the nitrogen. The polymerization itself, usually occurs between 200° and 300° C. and proceeds more rapidly than the polymerization with non-alkaline catalysts, such as water or acids.

It is also known that the base-catalyzed polymerization of lactams can be further accelerated by using, in addition to the alkaline reaction initiators, other compounds which activate the base-catalyzed polymerization of lactams. Compounds which activate the base-catalyzed polymerization of lactams will hereinafter be referred to briefly as polymerization activators.

As polymerization activators there have mainly been used halides of carboxylic acids and dicarboxylic acids, as for example benzoyl chloride or terephthaloyl chloride, and also other acid derivatives. The base-catalyzed polymerization of lactams using polymerization activators may be completed in a few minutes even at relatively low temperatures, for example slightly above the melting point of the lactam used.

From U.S. Patent 3,086,962 it is known that lactams may be polymerized in the presence of initiators and alkyl, cycloalkyl, aryl or aralkyl substituted ureas as activators. These activators have only slight accelerating action and the relatively long polymerization times required entail high operational costs. Moreover, it is not possible by using these activators to produce polyamides having high K-values. Polyamides thus prepared are not, therefore, particularly suitable for the manufacture of highly stressed parts. A further disadvantage is that polymerization must be carried out under a protective gas, such as nitrogen, and that even then the quality of the polyamides may be unsatisfactory.

The conventional systems of alkaline reaction initiators and the polymerization activators, only a few of which are technically feasible, are extremely sensitive even to traces of moisture or oxygen. The reaction medium has therefore to be carefully dehydrated prior to the commencement of the polymerization and the polymerization has to be carried out while excluding moisture and oxygen. Technical-grade lactams cannot be used direct, but must first be carefully purified and dried. In spite of this it is only in very rare cases that the reaction is reproducible, since the course of the polymerization is uncontrollably influenced by traces of impurities.

It is an object of the present invention to provide a process for the polymerization of lactams using alkaline reaction initiators and polymerization activators which is practically unaffected by the moisture contained in technical-grade lactams and by atmospheric oxygen. Another object of the invention is to improve the reproducibility of the course of the alkaline polymerization of lactams using polymerization activators. Other objects will become apparent from the following disclosure.

These objects are achieved by using as activators in the polymerization of lactams with alkaline reaction initiators and polymerization activators, substituted ureas, thioureas or guanidines in which at least one nitrogen atom is contained in a lactam ring system, which can be dissolved undecomposed in the lactam to be polymerized at the polymerization temperature and the substituents of which are resistant to the alkali metal compounds present in the reaction mixture at the polymerization temperature, i.e. they are not affected by them. Whether or not any substituted urea, thiourea and guanidine contemplated for use in the practice of our invention meets the above requirements can be easily ascertained by a preliminary experiment. Suitable activators are for example compounds of the general Formula I:

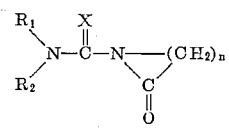

(I)

in which $R_1$ represents hydrogen or an alkyl, cycloalkyl or aryl radical with from 1 to 10 carbon atoms which may contain aromatically bound fluorine or ether groups, and $R_2$ represents an alkyl, cycloalkyl or aryl radical with from 1 to 10 carbon atoms or the radical

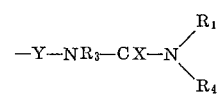

wherein Y represents an alkylene, cycloalkylene or arylene radical with from 1 to 10 carbon atoms, a chain bearing 1 or more secondary amino nitrogen atoms, a chain bearing one or more oxygen atoms or one or more $>SO_2$ groups or the radical

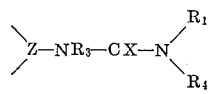

wherein Z represents a trivalent hydrocarbon radical with from 1 to 20 carbon atoms or a chain bearing a tertiary amino nitrogen atom, and $R_4$ has the same meaning as $R_1$, if $R_1$ and $R_4$ are members of a lactam ring, $n$ is preferably an integer from 5 to 8, and X represents oxygen, sulfur or the radical $NR_3$ in which $R_3$ has the same meaning as $R_1$.

When $R_1$ and $R_4$ in the two preceding formulas, together with the nitrogen to which they are attached, form a lactam ring, the activators of the invention may have the formula

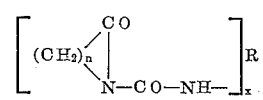

wherein $n$ is an integer in the range of 3–11 (preferably 5–8), $x$ is 2 or 3, and R is a hydrocarbon group having up to 20 carbon atoms.

The substituted ureas can be prepared in conventional manner, e.g., by mixing the melts of the lactams and mono-, di- or polyisocyanates. Substituted lactams can be produced by rearranging the substituted oximes. The preparation of the substituted ureas is generally described in the following publications:

Karrer, "Lehrbuch der Organischen Chemie," Georg-Thieme-Verlag, Stuttgard, 1948, page 249;
Klages, "Lehrbuch der Organischen Chemie." Walter de Gruyter-Verlag, 1952, vol. 1, pages 401 to 402;
Ber. d. dtsch. Chem. Ges., 38, 2359 (1905), Neuberg;
Ber. d. dtsch. Chem. Ges., 17, 2882 (1884), Kuhn.

The preparation of substituted thioureas is described in "The Systematic Identification of Organic Compounds," Wiley & Sons, 1956, page 227. The guanidines can be produced according to the process disclosed in Ber. d. dtsch. Chem. Ges., 9, 810 (1876);
J. Am. Chem. Soc., 53, 1552 (1931).

Substituted ureas suitable for use in the subject process can be prepared in the same way by using a lactam in place of an amine or the ether substituents described in the literature mentioned above.

Examples of suitable derivatives of urea, thiourea and guanidine of the above general formula are:

Pyrrolidone-N-carbonic acid anilide
Pyrrolidone-N-carbonic acid p-fluoranilide
Pyrrolidone-N-carbonic acid p-ethoxyanilide
Caprylic lactam-N-carbonic acid stearylamide

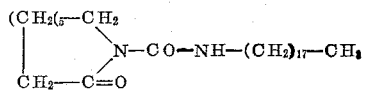

1,6-bis-(caprolactam-N-carbamido)-hexane
1,6-bis-(capryllactam-N-carbamido)-hexane
1,6-bis-(pyrrolidone-N-carbamido)-hexane

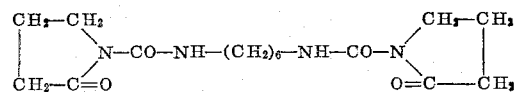

1,3-bis-(pyrrolidone-N-carbamido)-4-methylbenzene

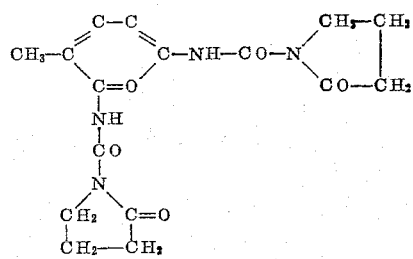

1,3-bis-(laurolactam-N-carbamido)-4-methyl-benzene
1,5-bis-(caprolactam-N-carbamido)-naphthalene
1,5-bis-(pyrrolidone-N-carbamido)-naphthalene
1,10-bis-(capryllactam-N-carbamido)-2-n-nonyldecane

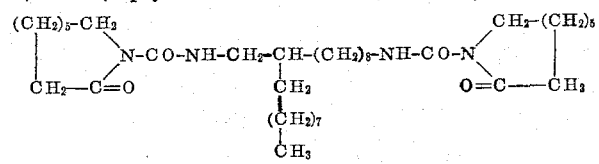

Capryllactam-N-carbonic acid-N',N''-dicyclohexylamidine

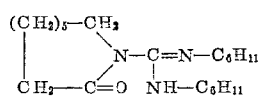

4,4',4'' - tris - (capryllactam - N - carbamido) - triphenylmethane

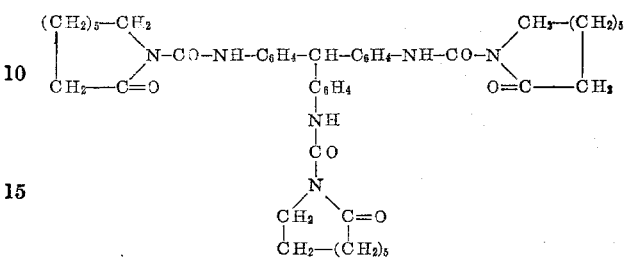

4,4',4''-tris-(caprolactam-N-carbamido)-triphenylmethane
6,6',6'' - tris - (capryllactam - N - carbamido)-tri-n-hexylamine

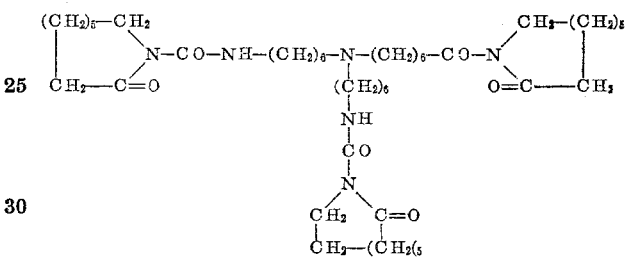

2,4,4'-tris-(capryllactam-N-carbamido)-biphenyl

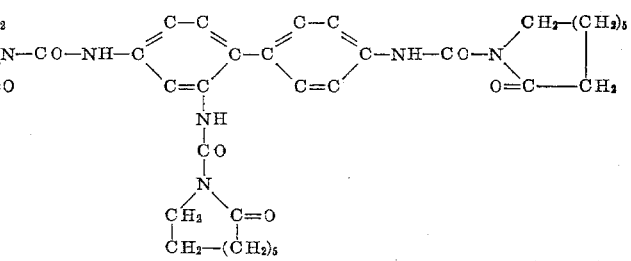

The compounds listed above which may be used as activators in the process according to the present invention may be prepared in conventional manner, for example by reacting phosgene, thiophosgene or diisocyanates with lactams containing the above-mentioned radicals.

With the aid of the said polymerization initiators it is possible to carry out the base-catalyzed polymerization of technical-grade lactams without special purification and drying. A content of up to 0.1% by weight of moisture in the lactams to be polymerized has practically no influence on the polymerization. Even lactams with up to 1% of moisture can be polymerized. In spite of small fluctuations in the moisture content, the course of the polymerization is reproducible. Polyamides of which the molecular weights can be varied within wide limits, for example by varying the concentration of the activator and initiator, may be obtained in a few minutes.

The polymerization according to the present invention may be carried out in open or closed molds, so that shaped articles can be immediately obtained.

Lactams with from 4 to 12 ring carbon atoms, such as pyrrolidone, piperidone, caprolactam, oenanthic lactam, capryllactam and lauric lactam, may be polymerized by the process according to this invention. Lactams with from 6 to 8 ring carbon atoms are especially suitable as are other lactams having at least 6 ring carbon atoms. Mixtures of said lactams can also be used.

The polymerization may be carried out in conventional manner, by causing the lactam to be polymerized or part thereof to react with a small amount of an alkaline reaction initiator, adding a polymerization activator according to the invention and heating the reaction mass at least locally to the polymerization temperature. Local heating is sufficient because the polymerization proceeds exothermically and the reaction mass therefore heats up spontaneously. Alternatively, the alkali metal lactam may be heated up to the polymerization temperature from the start and the polymerization initiated by adding the polymerization activator, if required dissolved in lactam. As a rule, the polymerization temperatures lie between 100° and 280° C. The activators may be used in amounts of 0.001 to 15% by weight, preferably from 0.1 to 5% by weight, with reference to the weight of the lactam to be polymerized.

Suitable alkaline reaction initiators are the alkali or alkaline earth metals known for this purpose, such as sodium, potassium or calcium, and also alkaline reacting compounds of alkali or alkaline earth metals, such as hydroxides, oxides, carbonates or hydrides of these metals. They are conveniently used in amounts of 0.05 to 5% by weight, preferably 0.1 to 1% by weight, with reference to the weight of the lactam to be polymerized.

The following examples will further illustrate this invention but the invention is not restricted to these examples. The parts given in the examples are parts by weight.

Example 1

500 parts of caprolactam are melted and, after heating the melt to 130° C., 25 parts of the reaction product from 1 mole of potassium hydroxide and 4 moles of capryllactam is added. Into the homogenized melt 6 parts of 1,6-bis-(caprolactam-N-carbamido)-hexane is run while stirring. The melt is poured in a mold heated to 190° C. The caprolactam takes 5 minutes to polymerize, giving a polyamide with the K-value 106 and a monomer content of 5.4%.

Example 2

A melt of 190 parts of ε-caprolactam, which contains 0.2 part of potassium, is heated to 240° C. after adding 4.6 parts of 1,6-bis-(capryllactam-N-carbamido)-hexane. The polymerization is complete after 4 minutes. The polymer has the K-value 131.1 and a monomer content of 4.21%.

Example 3

A melt of 260 parts of capryllactam to which 1.5 parts of sodium methylate and 15 parts of 1,6-bis-(pyrrolidone-N-carbamido)-hexane have been added, is polymerized in a mold at 130° C. The polymerization is complete after 5 minutes. The polyamide obtained, which has the K-value 100, can be easily processed in the molten condition. It has a monomer content of 2.8%.

Example 4

A melt of 1500 parts of caprolactam which contains 5.77 parts of sodium is mixed at 130° C. with a melt of 1300 parts of caprolactam, 70 parts of capryllactam and 57.2 parts of pyrrolidone-N-carbonic acid anilide. The polymerization begins immediately and is complete after eight minutes. The resultant polyamide has the K-value 64.5 determined on a 1% solution in sulfuric acid.

Example 5

A melt of 200 parts of technical-grade caprolactam which contains 2 parts of potassium is combined with a melt of 200 parts of technical-grade caprolactam which contains 10.4 parts of 1,5-bis-(caprolactam-N-carbamido)-naphthylene, at 90° C., and the mixture is placed in an oven heated to 220° C. It begins to polymerize immediately, turning highly viscous after six minutes and solid after eleven minutes. The polyamide has the K-value 64.0.

In no case does polymerization occur after sixty minutes when technical-grade caprolactam is heated under the conditions stated in this example, but in the absence of the activator.

Example 6

A melt of 100 parts of lauric lactam which contains 1 part of potassium is combined with a melt of 300 parts of lauric lactam which contains 0.5 part of 1,6-bis(capryllactam-N-carbamido)-hexane, at 160° C. The mixture solidifies immediately. The polymer does not dissolve in concentrated sulfuric acid.

Example 7

The following example serves to demonstrate the superiority of the activators according to our invention over the prior art activators.

(a) A melt of 400 parts of capryllactam which contains 6 parts of potassium and to which 3 parts of water (=0.6% by weight with reference to the melt) has been added is combined with a melt of 67.5 parts of 1,6-bis-(capryllactam-N-carbamido)-hexane (=4.9 mole percent referred to capryllactam) and 32.5 parts of capryllactam at 130° C. The polymerization begins immediately upon mixing the two melts. The mixture turns highly viscous after 1 minute and solid after 4 minutes. The polymer has too high a K-value for it to be soluble in concentrated sulfuric acid.

(b) A melt of 400 parts of capryllactam which contains 6 parts of potassium and to which 2.85 parts of water (=0.6% by weight with reference to the melt) has been added is combined with a melt of 42 parts of adipoyl dipyrrolidone (=4.9 mole percent with reference to the capryllactam) and 32.5 parts of capryllactam at 130° C. After 55 minutes the mixture is still mobile, i.e., no polymerization has occurred.

(c) A melt of 400 parts of capryllactam which contains 6 parts of potassium and to which 2.76 parts of water (=0.6% by weight with reference to the melt) has been added is combined with a melt of 27.5 parts of adipic dichloride (=4.9 mole percent with reference to the capryllactam) and 32.5 parts of capryllactam at 130° C. After 55 minutes the mixture is still mobile, i.e., no polymerization has occurred.

The following compounds are examples of activators for use in the practice of our invention:

(1) Pyrrolidone-N-carbonic acid anilide
(2) Pyrrolidone-N-carbonic acid p-fluoranilide
(3) Pyrrolidone-N-carbonic acid p-ethoxyanilide
(4) Capryllactam-N-carbonic acid stearylamide
(5) 1,3-bis-(pyrrolidone-N-carbamido)-4-methylbenzene
(6) 1,3-bis-(laurolactam-N-carbamido)-4-methylbenzene
(7) 1,5-bis-(pyrrolidone-N-carbamido)-naphthalene
(8) 1,10-bis-(capryllactam-N-carbamido)-2-n-nonyl-decane
(9) Capryllactam-N-carbonic acid-N',N''-dicyclohexyl-amidine
(10) 4,4',4''-tris-(capryllactam-N-carbamido)-triphenyl-methane
(11) 4,4',4''-tris-(caprolactam-N-carbamido)-triphenyl-methane
(12) 6,6',6''-tris-(capryllactam-N-carbamido)-tri-n-hexylamine
(13) 2,4,4'-tris-(capryllactam-N-carbamido)-biphenyl.

These compounds are used in the following Example 8.

Example 8

A melt of 200 parts of technical-grade capryllactam which contains 0.66 part of potassium is combined with a second melt of 200 parts of technical-grade capryllactam which contains X part of the activator described in the following table at 90° C. and placed in an oven heated to 220° C. The mixture immediately begins to polymerize and turns highly viscous and then solid as indicated below.

| Activator No. | Parts by weight | Time (in minutes) after which melt becomes— | | K-value according to Fikentscher |
|---|---|---|---|---|
| | | Viscous | Solid | |
| (1) | 3.4 | 2 | 3 | 80 |
| (2) | 1.2 | 8 | 12 | 85.5 |
| (3) | 1.5 | 7 | 11 | 87 |
| (4) | 2.18 | 8 | 15 | 68 |
| (5) | 1.72 | 4 | 8 | 100.5 |
| (6) | 3 | 8 | 13 | 111 |
| (7) | 1.9 | 6 | 11 | 91 |
| (8) | 3.03 | 7 | 15 | 72.5 |
| (9) | 1.7 | 10 | 15 | 82.5 |
| (10) | 4 | | 1 | (1) |
| (11) | 5.9 | 2 | 4 | (1) |
| (12) | 6 | 1 | 2 | (1) |
| (13) | 5.5 | 1 | 2 | (1) |

[1] Insoluble in sulfuric acid.

When working under the aforesaid conditions, but in the absence of an activator, no polymerization occurs within a period of 40 minutes.

*Example 9*

5000 parts of anhydrous α-pyrrolidone which contain 38.3 parts of sodium are combined with 5000 parts of anhydrous cyclohexane which contain 85 parts of 1,6-bis-(pyrrolidone-N-carbamido)-hexane. After stirring the mixture for 24 hours a thick crystalline pulp is obtained. This is hydroextracted, washed well with water and dried in vacuo at 70° C., giving a white pulverulent polyamide in a yield of 75%. The polyamide has the K-value 107.5 determined on a 1% solution in formic acid.

We claim:

1. In a process for polymerizing lactams having one —CONH— group in the lactam ring and having at least 6 ring carbon atoms in the presence of a catalyst selected from the group consisting of alkali metal lactams and alkaline earth metal lactams, the improvement which comprises polymerizing said lactams at temperatures above 100° C. in the presence of 0.1 to 15% by weight, based on said lactam, of a polymerization activator of the formula

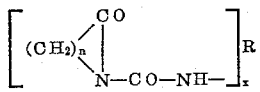

wherein $n$ is an integer in the range of 3–11, inclusive, $x$ is 2 or 3, and R is a hydrocarbon group having up to 20 carbon atoms.

2. A process as claimed in claim 1 wherein $n$ is an integer in the range of 5–8, inclusive, and said lactam which is polymerized is a technical-grade lactam containing a minor amount of moisture not exceeding 1%.

3. A process as claimed in claim 2 wherein said polymerization is conducted in the presence of atmospheric oxygen.

4. A process as claimed in claim 2 wherein R is alkylene and $x$ is 2.

5. A process as claimed in claim 2 wherein R is arylene and $x$ is 2.

6. A process as claimed in claim 2 wherein R is hexamethylene and $x$ is 2.

7. A process as claimed in claim 2 wherein R is 2-n-nonyldecylene-1,10 and $x$ is 2.

8. A process as claimed in claim 2 wherein R is toluylene-2,4 and $x$ is 2.

9. A process as claimed in claim 2 wherein R is naphthylene-1,5 and $x$ is 2.

10. A process as claimed in claim 2 wherein R is a trivalent hydrocarbon group and $x$ is 3.

11. A process as claimed in claim 2 wherein R is triphenylene-4,4′,4″-methane and $x$ is 3.

12. A process as claimed in claim 2 wherein R is a trivalent biphenyl group and $x$ is 3.

13. A process for polymerization of a technical grade lactam selected from the group consisting of caprolactam and capryllactam, said technical grade lactam containing a minor amount of water not exceeding 1%, which comprises polymerizing said technical grade lactam in melt form at a temperature above 100° C. in the presence of an alkali metal lactam and 0.1 to 15% by weight, based on said lactam, of a polymerization activator of the formula

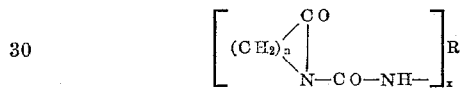

wherein $n$ is an integer in the range of 3–11, inclusive, $x$ is 2 or 3, and R is hydrocarbon group having up to 20 carbon atoms, said melt becoming solid within a few minutes after initiation of the polymerization.

14. A process as claimed in claim 13 wherein R is hexamethylene and $x$ is 2.

References Cited by the Examiner

UNITED STATES PATENTS

| 3,017,391 | 1/1962 | Mottus et al. | 260—78 |
| 3,028,369 | 4/1962 | Butler et al. | 260—78 |
| 3,086,962 | 4/1963 | Mottus et al. | 260—78 |
| 3,148,174 | 9/1964 | Glickman et al. | 260—78 |

OTHER REFERENCES

The Naming and Indexing of Chemical Compounds, Chemical Abstracts, vol. 56, January–June 1962, pp. 88 and 91 relied on. (Introduction to the Subject Index of Volume 56.) Copy in Scientific Library QD7/C4.

WILLIAM H. SHORT, *Primary Examiner.*

H. D. ANDERSON, *Assistant Examiner.*